(12) United States Patent
Sambhy et al.

(10) Patent No.: US 12,043,752 B2
(45) Date of Patent: Jul. 23, 2024

(54) FUSER, METHOD OF FUSER MANUFACTURE AND COMPOSITION

(71) Applicant: Xerox Corporation, Norwalk, CT (US)

(72) Inventors: Varun Sambhy, Pittsford, NY (US); Kevin Howard Taft, Williamson, NY (US); Brian Gillis, Penfield, NY (US); Santokh S. Badesha, Pittsford, NY (US); Lindsay J. Goggins, Ontario, NY (US); James J. Padula, Webster, NY (US); John R. Lambie, Ontario, NY (US); David Scott Derleth, Webster, NY (US); James D. Quigley, Manchester, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 17/852,967

(22) Filed: Jun. 29, 2022

(65) Prior Publication Data

US 2024/0002691 A1 Jan. 4, 2024

(51) Int. Cl.
- *C09D 127/16* (2006.01)
- *C09D 7/20* (2018.01)
- *C09D 7/65* (2018.01)
- *G03G 15/20* (2006.01)

(52) U.S. Cl.
CPC .............. *C09D 127/16* (2013.01); *C09D 7/20* (2018.01); *C09D 7/65* (2018.01); *G03G 15/2057* (2013.01)

(58) Field of Classification Search
CPC .......... C09D 127/16; C09D 7/65; C09D 7/20; G03G 15/2057
USPC ......................................................... 524/261
See application file for complete search history.

(56) References Cited

U.S. PATENT DOCUMENTS 5,999,787 A * 12/1999 Finsterwalder .... G03G 15/2057
399/329
2012/0049400 A1* 3/2012 Wu .......................... B29C 33/68
264/129

* cited by examiner

*Primary Examiner* — Kelechi C Egwim
(74) *Attorney, Agent, or Firm* — MH2 Technology Law Group LLP

(57) ABSTRACT

The present teachings include a flow coating solution, a fuser member and an image forming apparatus. The fuser member includes a substrate and flow coating solution applied onto the substrate. The outer layer includes a flow coating solution including a fluoroelastomer, a nucleophilic crosslinking agent and a non-functional polydimethylsiloxane having the formula:

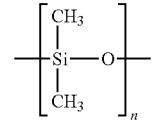

wherein n is from 100 to 20,000. The flow coating solution includes an effective solvent selected from the group consisting of N-methyl 2-pyrrolidone, dimethyl formamide, and dimethyl sulfoxide.

20 Claims, 4 Drawing Sheets

FUSER, METHOD OF FUSER MANUFACTURE AND COMPOSITION

BACKGROUND

Field of Use

This disclosure is generally directed to fuser members useful in electrophotographic imaging apparatuses, including digital, image on image, and the like. This disclosure also relates to processes for making and using fuser members.

Background

In a typical electrophotographic imaging apparatus, an image of an original to be copied, or an electronic document image, is recorded in the form of an electrostatic latent image upon a photosensitive member and the latent image is subsequently rendered visible by the application of thermoplastic resin particles or composites thereof which are commonly referred to as toner. The visible toner image is in a loose powdered form and can be easily disturbed or destroyed. The toner image is usually fixed or fused upon a substrate or support member which may be a cut sheet or continuous media, such as plain paper.

Certain defects in fixing or fusing the toner image may occur. One such defect is a visual banding seen in process direction and is especially pronounced in full solid blacks.

There is a need to eliminate such visual banding. It would be desirable to provide fuser members and method of manufacturing fuser members that eliminate such defects.

SUMMARY

According to various embodiments, there is provided a flow coating solution including a fluoroelastomer, a nucleophilic crosslinking agent and a non-functional polydimethylsiloxane having the formula:

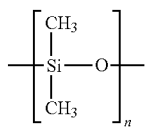

wherein n is from 100 to 20,000. The flow coating solution includes an effective solvent selected from the group consisting of N-methyl 2-pyrrolidone, dimethyl formamide, and dimethyl sulfoxide.

An alternate embodiment disclosed herein includes a fuser member including a substrate and a fluoroelastomer layer. The fluoroelastomer layer is prepared by flow coating a flow coating solution onto the substrate by rotating the substrate in a horizontal position about a longitudinal axis thereof and simultaneously applying the flow coating solution from an applicator to the substrate in a spiral pattern in a controlled amount so that substantially all the coating from the applicator adheres to said substrate. The flow coating solution includes a fluoroelastomer, a nucleophilic crosslinking agent and a non-functional polydimethylsiloxane having the formula:

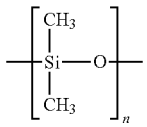

wherein n is from 100 to 20,000. The flow coating solution includes an effective solvent selected from the group consisting of N-methyl 2-pyrrolidone, dimethyl formamide, and dimethyl sulfoxide.

A further aspect described herein is an image forming apparatus including a charge-retentive surface to receive an electrostatic latent image thereon, a development component to apply toner to said charge-retentive surface to develop said electrostatic latent image to form a developed image on said charge retentive surface, a transfer component to transfer the developed image from said charge retentive surface to a copy substrate and a fuser member for fusing toner images to a surface of said copy substrate. The fuser member includes a substrate and a fluoroelastomer layer. The fluoroelastomer layer is prepared by flow coating a flow coating solution onto the substrate by rotating the substrate in a horizontal position about a longitudinal axis thereof and simultaneously applying the flow coating solution from an applicator to the substrate in a spiral pattern in a controlled amount so that substantially all the coating from the applicator adheres to said substrate. The flow coating solution includes a fluoroelastomer, a nucleophilic crosslinking agent and a non-functional polydimethylsiloxane having the formula:

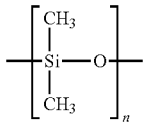

wherein n is from 100 to 10,000. The flow coating solution includes an effective solvent selected from the group consisting of N-methyl 2-pyrrolidone, dimethyl formamide, and dimethyl sulfoxide.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

Figure 1:
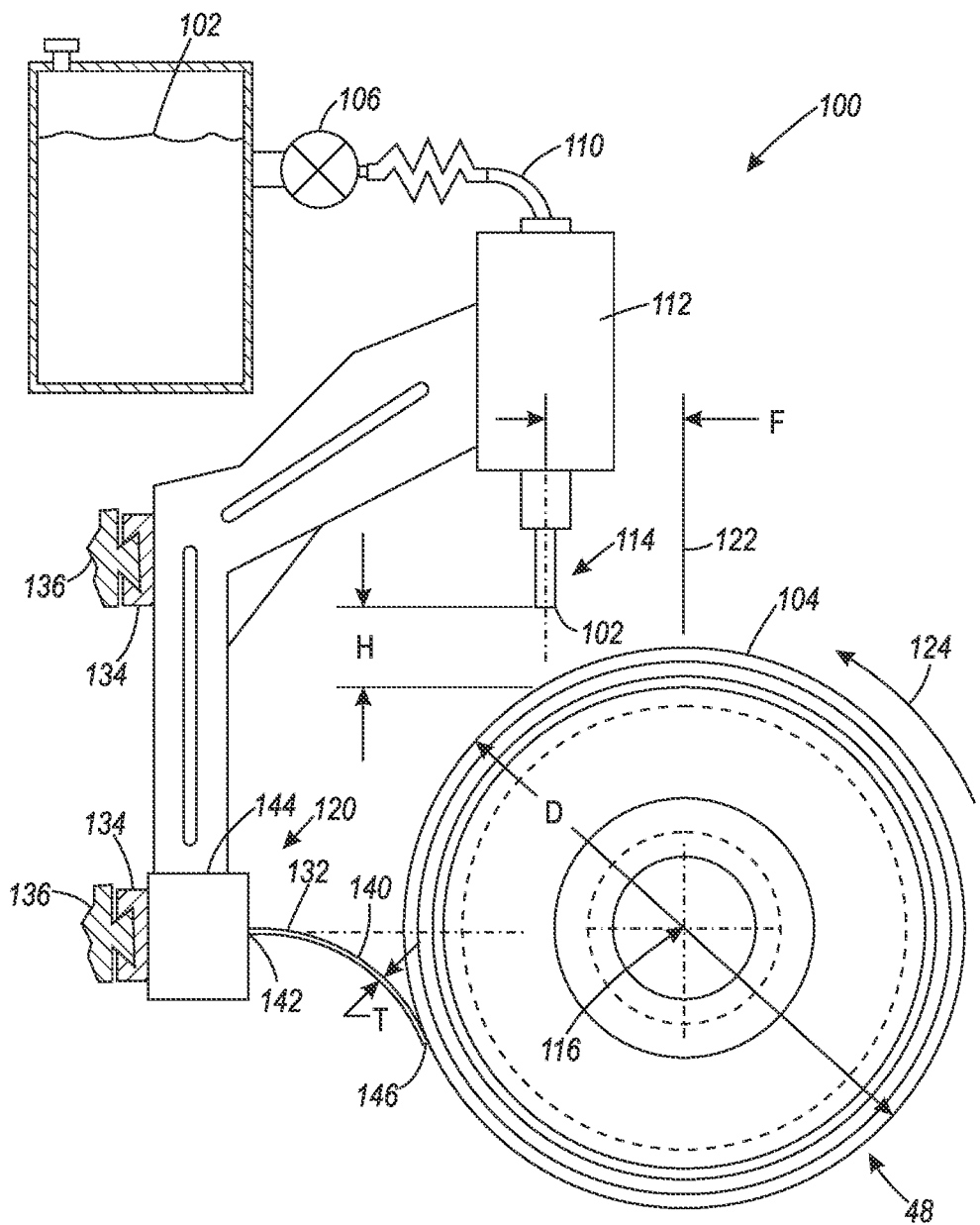
FIG. 1 is an end view of a flow coated fuser roll being prepared on a turning apparatus according to an embodiment disclosed here.

It should be noted that some details of the drawings have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Fuser member as used herein refers to fuser members including fusing rolls, belts, films, and the like; donor members, including donor rolls, belts, films, and the like; and pressure members, including pressure rolls, belts, films, and the like; and other members useful in the fusing system of an electrostatographic or xerographic machine. It will become evident from the following discussion that the fuser member disclosed herein may be employed in a wide variety of machines and is not specifically limited in its application to the particular embodiment depicted herein.

Any suitable substrate may be used as the substrate for the fuser member. The fuser member may be a roll, belt, flat surface or other suitable shape used in the fixing of thermoplastic toner images to a suitable copy substrate. It may take the form of a fuser member, a pressure member or a release agent donor member in the form of a cylindrical roll, belt or film. Typically, the roll fuser member is made of a hollow cylindrical metal core, such as copper, aluminum, steel, or certain plastic materials chosen to maintain rigidity, structural integrity, as well as being capable of having a fluoroelastomer coated thereon and adhered firmly thereto. In embodiments, the supporting substrate is a cylindrical sleeve having an outer layer of from about 1 to about 6 mm. In one embodiment, the core which may be a steel cylinder is degreased with a solvent and cleaned with an abrasive cleaner prior to being primed with a primer, such as Dow Corning 1200, which may be sprayed, brushed or dipped, followed by air drying under ambient conditions for thirty minutes and then baked at 150° C. for 30 minutes.

Examples of suitable fusing layers, such as outer fusing layer of the fuser member herein include polymers such as fluoropolymers, for example, polytetrafluoroethylene (PTFE), fluorinated ethylenepropylene copolymer (FEP), polyfluoroalkoxypolytetrafluoroethylene (PFA Teflon) and the like and copolymers, terpolymers or tetrapolymers thereof; silicone rubbers, including fluorosilicone; and elastomers such as fluoroelastomers. In embodiments, elastomers are fluoroelastomers. Specifically, suitable fluoroelastomers are those described in detail in U.S. Pat. Nos. 5,166,031, 5,281,506, 5,366,772 and 5,370,931, together with U.S. Pat. Nos. 4,257,699, 5,017,432 and 5,061,965, the disclosures each of which are incorporated by reference herein in their entirety. As described therein these fluoroelastomers, particularly from the class of copolymers, terpolymers, and tetrapolymers of vinylidenefluoride, hexafluoropropylene and tetrafluoroethylene and a possible cure site monomer, are known commercially under various designations as VITON A™, VITON E™, VITON E60C™, VITON E430™, VITON 910™, VITON GH™ and VITON GF™. The VITON™ designation is a Trademark of E.I. DuPont de Nemours, Inc. Other commercially available materials include FLUOREL 2170™, FLUOREL 2174™, FLUOREL 2176™, FLUOREL 2177™ and FLUOREL LVS 76™ FLUOREL™ is a Trademark of 3M Company. Additional commercially available materials include AFLAS™ a poly (propylene-tetrafluoroethylene) and FLUOREL II™ (LII1900) a poly(propylene-tetrafluoroethylenevinylidenefluoride) both also available from 3M Company, as well as the TECNOFLONS™ identified as FOR-60KIR™, FOR-LHF™, NM™ FOR-THF™, FOR-TFS™, TH™, TN505™ available from Montedison Specialty Chemical Company. In another embodiment, the fluoroelastomer is one having a relatively low quantity of vinylidenefluoride, such as in VITON GF™, available from E.I. DuPont de Nemours, Inc. The VITON GF™ has 35 mole percent of vinylidenefluoride, 34 mole percent of hexafluoropropylene and 29 mole percent of tetrafluoroethylene with 2 percent cure site monomer. The cure site monomer may be those available from DuPont such as 4-bromoperfluorobutene-1, 1,1-dihydro-4-bromoperfluorobutene-1, 3-bromoperfluoropropene-1, 1,1-dihydro-3-bromoperfluoropropene-1, or any other suitable, known, commercially available cure site monomer.

Examples of fluoroelastomers suitable for use herein for the outer layer of the fuser member disclosed herein, include fluoroelastomers of the above type, along with hydrofluoroelastomers including volume grafted elastomers. Volume grafted elastomers are a special form of hydrofluoroelastomer and are substantially uniform integral interpenetrating networks of a hybrid composition of a fluoroelastomer and non-functional polydimethylsiloxane, the volume graft having been formed by dehydrofluorination of fluoroelastomer by a nucleophilic dehydrofluorinating agent, followed by addition polymerization by the addition of a non-functional polydimethylsiloxane and a polymerization initiator. Examples of specific volume graft elastomers are disclosed in U.S. Pat. Nos. 5,166,031; 5,281,506; 5,366,772; and 5,370,931, the disclosures each of which are herein incorporated by reference in their entirety.

Volume graft, in embodiments, refers to a substantially uniform integral interpenetrating network of a hybrid composition, wherein both the structure and the composition of the fluoroelastomer and non-functional polydimethylsiloxane are substantially uniform when taken through different slices of the fuser member. A volume grafted elastomer is a hybrid composition of fluoroelastomer and non-functional polydimethylsiloxane formed by dehydrofluorination of fluoroelastomer by nucleophilic dehydrofluorinating agent followed by addition polymerization by the addition of non-functional polydimethylsiloxane.

Interpenetrating network, in embodiments, refers to the addition polymerization matrix where the fluoroelastomer and non-functional polydimethylsiloxane polymer strands are intertwined in one another.

Hybrid composition, in embodiments, refers to a volume grafted composition which is comprised of fluoroelastomer and non-functional polydimethylsiloxane blocks randomly arranged.

Generally, the volume grafting disclosed herein is performed in two steps, the first involves the dehydrofluorination of the fluoroelastomer using an amine. During this step, hydrofluoric acid is eliminated which generates unsaturation, carbon to carbon double bonds, on the fluoroelastomer. The second step is the free radical peroxide induced addition polymerization of the non-functional polydimethylsiloxane with the carbon to carbon double bonds of the fluoroelastomer. In embodiments, copper oxide can be added to a solution containing the graft copolymer. The dispersion is then provided onto the fuser member.

In embodiments, the non-functional polydimethylsiloxane having functionality can be represented by the formula:

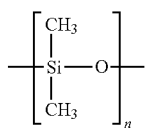

where n is from 100 to 20,000 or in embodiments from 100 to 10,000. The amount of fluoroelastomer used to provide the outer layer of the fuser member disclosed herein is dependent on the amount necessary to form the desired thickness of the layer or layers of fuser member. In embodiments, the outer fusing layer be coated to a thickness of from about 6 to about 12 mils, or from about 7 to about 10 mils. Specifically, the fluoroelastomer for the outer layer is added in an amount of from about 10 to about 40 percent, or from about 15 to about 35 percent by weight of total solids. Total solids as used herein in reference to the outer fluoroelastomer layer refers to the total amount of fluoroelastomer, dehydrofluorinating agent, solvent, adjuvants, fillers, crosslinking agent, and conductive fillers.

Conductive fillers may be dispersed in a fusing layer of the fuser member disclosed herein. In an embodiment a metal oxide or carbon black is dispersed in the fluoroelastomer surface. In an embodiment, the metal oxide is one which is capable of interacting with the functional groups of the polymeric release agent to form a thermally stable film which releases the thermoplastic resin toner and prevents the toner from contacting the elastomer material itself. In addition, it is important that the metal oxide be substantially non-reactive with the elastomer so that no substantial dehydrofluorination of the vinylidenefluoride in the polymer may take place. In embodiments, the metal oxide is cupric oxide, which has been found to be a weak base and softens rather than hardens the elastomer with time thereby maintaining good copy quality. In another embodiment, the metal oxide is aluminum oxide. In embodiments, fillers include a combination of aluminum oxide and cupric oxide. Other metal oxide options include nickel oxide, ferric oxide, manganese oxide, molybdenum oxide, and the like. The metal oxide is typically present in an amount of from about 5 to 30 parts by weight per hundred parts of the polymer or in embodiments from about 10 to 20 parts by weight of metal oxide. In addition, the particle size of the metal oxide is important and it should not be so small as to interfere with the curing of the polymer nor so large as to supply an insufficient number of particles disbursed throughout the elastomer surface for good release properties. Typically, the metal oxide particles have a mean diameter of from about 2 to 10 microns, or in embodiments 6 microns.

The dehydrofluorinating agent which attacks the fluoroelastomer generating unsaturation is selected from basic metal oxides such as MgO, CaO, Ca(OH)$_2$ and the like, and strong nucleophilic agents such as primary, secondary and tertiary, aliphatic and aromatic amines, where the aliphatic and aromatic amines have from about 2 to about 30 carbon atoms. Also included are aliphatic and aromatic diamines and triamines having from about 2 to about 30 carbon atoms where the aromatic groups may be benzene, toluene, naphthalene, anthracene, and the like. In embodiments, the aromatic diamines and triamines that the aromatic group be substituted in the ortho, meta and para positions. Typical substituents include lower alkyl amino groups such as ethylamino, propylamino and butylamino.

In the case of flow coating the fluoroelastomer and crosslinking agent, it is desirable that the elastomer and crosslinking agent dissolve completely in the solvent and remain dissolved throughout the flow coating procedure. It is further necessary that the fluoroelastomer and/or curing agent dissolved in solvent strike a balance between flowability and viscosity as described above. Also, it is desirable for the flow coating solution to have a suitable balance of viscosity and evaporation rate (drying) to enable single pass uniform thickness coatings which impact throughput and adhesion performance.

A solvent suitable for dissolving a fluoroelastomer may be used. Further, a crosslinking or curing agent is used to stimulate crosslinking of the fluoroelastomer. The solvent must have the ability to thoroughly dissolve the fluoroelastomer into solution form. Also, the combination of solvent, fluoroelastomer and crosslinking and/or curing agent, should react so as to prevent the formation of precipitates or crystallites which tend to clog the filters and pump of the flow coating apparatus, and which may cause bubbles or defects in the final coated fuser member. Further, the solvent and crosslinking or curing agents must possess properties which allow for the coating solution of solvent, fluoroelastomer, crosslinking agent or curing agent to remain in solution form during the entire flow coating manufacturing process which may take from 8 hours to a few days.

Examples of suitable solvents include effective solvents. Effective solvents as used herein are solvents which when mixed with a fluoroelastomer and curing or crosslinking agents, possess the ability to completely dissolve the fluoroelastomer in order to enable the fluoroelastomer to be flow coated, without allowing for precipitates to form during the flow coating process. The solvents have the ability to completely dissolve the curing/crosslinking agent and are compatible with the fluoroelastomer solvent solution enabling the coating solution to be flow coated in a manufacturing environment which may last a few days, for example from about 1 to about 4 days. Effective solvents include polar solvents such as water, methyl alcohol, ethyl alcohol, acetone, methyl ethyl ketone and methyl iso-butyl ketone, along with the Wittig reaction solvents such as dimethyl formamide (DMF), dimethyl sulfoxide (DMSO) and N-methyl 2 pyrrolidone (NMP). In embodiments, solvents are the Wittig reaction solvents. Specifically, the solvent is added in an amount of from about 60 to about 90 percent, or in embodiments, from about 65 to about 85 percent by weight of total solids.

The curing and/or crosslinking agents are the nucleophilic curing agents such as VITON CURATIVE VC-50™ which incorporates an accelerator (such as a quaternary phosphonium salt or salts like C-20) and a crosslinking agent (bisphenol AF or C-30); DIAK 1 (hexamethylenediamine carbamate) and DIAK 3 (N,N'-dicinnamylidene-1,6 hexanediamine). The curing and/or crosslinking agent is added in an amount of from about 1 to about 10 weight percent, and in embodiments from about 2 to about 6 weight percent of fluoroelastomer solids.

The viscosity of the flow coating solution comprising a fluoroelastomer, nucleophilic crosslinking agent and effective solvent, may be from about 10 to 10,000 cP (centipoise), or from 10 to 1000 Cp, or from 200 to about 3500 Cp or from 5000-10000 Cp. Viscosities in this range provide adequate flowability and enable thin coatings which exhibit superior adhesion. It is also desirable for the coating solution to be slow drying in order to avoid trapping solvent in the underlayers which may cause bubble formation. In addition, it is desirable to evaporate the solvent and "cure" the fluoroelastomer in the range of from about 5 to about 60 minutes.

Other adjuvants and fillers may be incorporated in the elastomer as long as they do not affect the integrity of the fluoroelastomer. Such fillers normally encountered in the compounding of elastomers include coloring agents, reinforcing fillers, and processing aids.

A thin surface layer of a non-functional polydimethylsiloxane made by Wacker is applied to the fluoroelastomer as a release agent. The non-functional polydimethylsiloxane has the general structure shown in structure below—

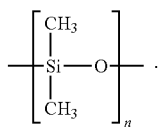

The structure with n is from 100 to 20000, or from 100 to 10,000, or from 1000 to 10000 or from 100 to 1000, and a viscosity from 10 to 10,000 cP (centipoise), or from 10 to 1000 Cp, or from 200 to about 3500 Cp or from 5000-10000 Cp. Such a non-functional polydimethylsiloxane is available from Wacker.

The flow coating solution comprising an effective solvent, fluoroelastomer, non-functional polydimethylsiloxane and crosslinking or curing agent may be coated on the fuser roll substrate by means of a new coating procedure referred to as flow coating. The flow coating procedure will now be described in detail with reference to the drawings. In FIG. 1, a fuser roll is depicted as an example of an embodiment. However, the disclosure herein is useful for coatings of fuser belts, films, and the like; donor rolls, belts, films, and the like; pressure rolls, belts, films and the like; and like fuser members.

Referring to FIG. 1, the apparatus 100 is used to apply coating solution 102 to periphery 104 of the fuser roll 48. The coating solution is pumped via pump 106 through a conduit typically in the form of a pipe 110 to an applicator 112 including nozzle 114 through which the coating solution 102 flows onto periphery 104 of the roll 48.

The coating solution 102 is applied to the periphery 104 in a spiral fashion in which the fuser roll 48 rotates about its longitudinal axis 116 while in a horizontal position, while the applicator 112 translates in a direction parallel to the longitudinal axis 116 of the fuser roll 48 along the length of the substrate in a horizontal position. The coating solution 102 is thus applied to the periphery 104 of the fuser roll 48 in a spiral fashion. The application of the coating is similar to the path of a cutting tool when turning the periphery of a shaft in a standard lathe. By accurately controlling the amount of coating solution 102 that is displaced through pump 106 and/or by controlling accurately in any manner the amount of coating solution 102 that is released at the nozzle 114 of applicator 112, substantially all the coating solution 102 that passes through the nozzle 114 adheres to the roll 48. The amount of coating released through the applicator per rotation in order to obtain sufficient coating depends mostly on the viscosity of the coating, the size (circumference and length) of the fuser member to be coated, the desired thickness of the layer, the rate of flow of the coating, and other like parameters. By making the correct calculations, flow coating can be achieved wherein substantially all of the coating from the applicator adheres to the surface of the fuser member. "Substantially all" as used herein means from about 80 to about 100 percent of the coating initially released from the nozzle will adhere to the fuser member. In embodiments from about 95 to about 100 percent will adhere to the fuser member. In other words, from about 95 to about 100 percent of the solution coating of solvent, fluoroelastomer and curing or crosslinking agent applied to the substrate adheres to the substrate.

Using flow coating, a very fine coating may be precisely coated onto a substrate. In particular, Applicants have been successful in obtaining a coating layer of about 0.0001 to about 0.0050 inches per pass, or in embodiments about 0020 inches per pass with a tolerance range of +/−0.0001 inches. Being able to control the thickness of the coating with such precision will virtually obviate the need for grinding and other post coating operations particularly for use in fusing color images where glossy finish on images is desired. For black and gray tone images where a flat image is desired, however, the surface may be too smooth following flow coating. Therefore, subsequent grinding and or polishing operations may be required to obtain the dull or flat finish.

Apparatus 100 may have any suitable form and consists of any equipment capable of rotating the fuser roll 48 about longitudinal axis 116 while translating the applicator 112 in a direction parallel to the longitudinal axis 116 of the fuser roll. Standard CNC (computerized numerical control) or engine lathes may be used for this purpose. Specialty equipment may also be designed which will rotate the fuser roll while translating the applicator. Specialized equipment may be advantageous to permit the proper enclosure of the apparatus 100 to contain possible volatile coating solutions and to maintain specific environmental conditions necessary for quality coatings from this process.

When applying the coating using an apparatus 100 with an applicator 112 which applies a spiral coating through the nozzle 114, the coating is applied in a thread-like fashion and may have peaks and valleys on the periphery 104 of the roll 48. The placement of a member in the form of guide 120 against the periphery 104 of the roll 48 as the coating solution 102 is applied to the roll, significantly improves the uniformity of the coating upon the roll 48. The longitudinal axis 116 of the roll 48 is positioned horizontally with respect to the floor of the building in which the apparatus is housed. This configuration permits for the effects of gravity to properly distribute the coating solution 102 about the periphery 104 of the roll 48.

Similarly, the applicator 112 is positioned above the fuser roll 40 so that the stream of coating solution coming from the nozzle 114 may rest upon the periphery 104 of the roll 48. The tip 120 of nozzle 114 is spaced a distance H above the periphery 104 of the roll 48. If the tip 120 is placed too far from the periphery 104 the coating solution 102 will evaporate before it reaches the periphery. If the tip 120 is placed too closely to the periphery 104, the tip will hit the periphery 104. For a roll having a diameter D of approximately four inches, a distance H of approximately ¼ of an inch is adequate. Positioning of the applicator 112 at a position F of approximately one inch from vertical axis 122 of the roll in the direction of rotation 124 of the roll is sufficient. The dynamics of the rotation of the roll and its position on the periphery of the roll assist in the uniform distribution of the solution 102 on the periphery of the roll.

Figure 2:
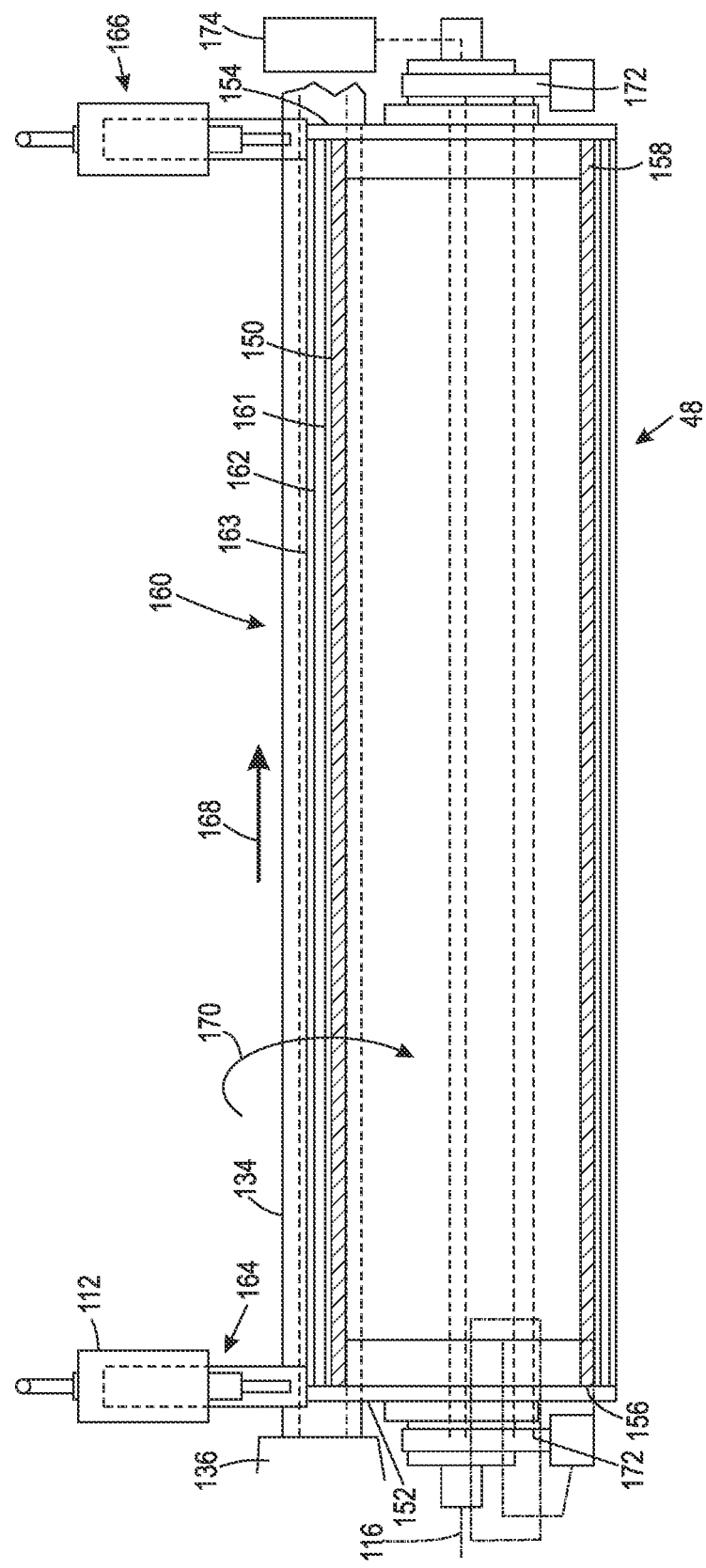
FIG. 2 is a sectional view of the FIG. 1 fuser roll.

Referring now to FIG. 2, the fuser roll 48 and the apparatus 100 are shown in greater detail. The fuser roll 48 may be made of any suitable durable material which has satisfactory heat transfer characteristics. For example, as shown in FIG. 2, the fuser roll 48 includes a substrate in the form of a core 150 having a generally tubular shape and made of a thermally conductive material, for example, aluminum or a polymer. To provide for the driving of the roll, the roll 48 typically includes first end cap 152 and second end cap 154 located at first end 156 and second end 158 of the core 150, respectively.

The operation of the apparatus as shown in FIG. 2 is such that the applicator 112 translates from first position 164 as shown in solid to second position 166 as shown in phantom. The applicator 112 thus travels along with the slide 134 in the direction of arrow 168. The direction of travel of the applicator 112 is parallel to longitudinal axis 116 of fuser roll 48. Concurrently with the translation of the applicator 112, the roll 48 rotates in the direction of arrow 170. The roll 48 is supported in any suitable fashion such as by feed blocks 172 and is rotated in any suitable fashion such as by driver 174 which contacts end cap 154.

The flow coating process for a fuser roll includes first the step of providing a generally cylindrical shaped substrate. The substrate is rotated about a longitudinal axis of the substrate. A fluid coating is applied to the periphery of the substrate in a spiral pattern utilizing a guide to direct the coating onto the periphery of the substrate. After the coating is fully applied, the coating is ground to a precision tolerance. To obtain optimum surface configuration, subsequent operations such as super-finishing or polishing the outer periphery may also be required.

The coating may be applied in a solution with coating additives. Such a solution with approximately from about 10 to about 40, or in embodiments, from about 15 to about 35 percent solids has been found to be effective. The coating may be applied at any satisfactory rate. Applicants have found that a thickness rate of from about 0.001 to about 0.005 inches, and in embodiments from about 0.002 inches per pass is most effective. This is the thickness which is applied along the length of the roll during the roll's rotation. This amount is the amount that allows for substantially all of the coating applied to remain on the roll without dripping off or clumping up.

The following Examples further define and describe embodiments disclosed herein. Unless otherwise indicated, all parts and percentages are by weight.

Specific embodiments will now be described in detail. These examples are intended to be illustrative, and not limited to the materials, conditions, or process parameters set forth in these embodiments. All parts are percentages by solid weight unless otherwise indicated.

EXAMPLES

Preparation of an Aerogel/PFA Powder Composition Containing 1% Silica Aerogel (I):

AK5000 is a non-functional polydimethylsiloxane made by Wacker with viscosity of 5000 cP. It has the general structure shown in figure below—

Experimental trials were carried out at FDU (fuser development unit) to test the coating quality of a fluoroelastomer topcoat made with a non-functional polydimethylsiloxane as an additive in place of a polyorganosiloxane. Viton topcoat formulation was made in which a polyorganosiloxane, AKF290 (F1) from Wacker, was replaced with an equal amount of a non-functional polydimethylsiloxane, AK5000 (F2), also available from Wacker. Viton formulation was flow coated on fuser silicone core. Multiple fusers (up to 10 replicates) were coated with F2 formulation and current mainline F1 as a control. The coated fuser rolls were cured and super-finished/polished by FDU using identical methods used in their production lines. The rolls were evaluated for topcoat quality by FDU manufacturing quality control lab. QC lab's analysis was that fuser rolls made with F2 showed no coating quality defects and were identical in coating quality to mainline F1 (surface roughness, no pin holes and fish-eyes) as shown in Table 1.

Table 1. Flow coated fuser roll inspection data of from FDU production line quality control station.

TABLE 1

| Leveling fluid | Durometer (Avg) | Diameter (Avg) | Runout (Avg) | Surface Finish (Avg) | Gloss (Avg) | Visual Inspection Status |
| --- | --- | --- | --- | --- | --- | --- |
| F1 | 68.92 | 104.061 | 0.020667 | 1.12 | 37.46667 | Pass |
| F1 | 68.32 | 104.0652 | 0.026 | 1.186667 | 38.06667 | Pass |
| F1 | 68.84 | 104.076 | 0.015 | 1.15 | 38.96667 | Pass |
| F2 | 69.1 | 104.0778 | 0.021 | 1.123333 | 41.3 | Pass |
| F2 | 70.16 | 104.0696 | 0.034333 | 1.093333 | 38.43333 | Pass |
| F2 | 67.96 | 104.075 | 0.043 | 1.196667 | 40.06667 | Pass |
| F2 | 68.32 | 104.0844 | 0.026667 | 1.233333 | 40.1 | Pass |
| F2 | 68.4 | 104.0564 | 0.06 | 1.1 | 41.16667 | Pass |
| F2 | 68.72 | 104.0652 | 0.012 | 1.203333 | 38.13333 | Pass |
| F2 | 69.66 | 104.0592 | 0.015 | 1.183333 | 40.9 | Pass |
| F2 | 68.46 | 104.06 | 0.048667 | 1.266667 | 37.26667 | Pass |
| F2 | 68.64 | 104.061 | 0.022 | 1.113333 | 39.5 | Pass |
| F2 | 69.38 | 104.0602 | 0.065 | 0.803333 | 48.9 | Pass |

When using the flow coating process to produce belts or films, the belts or films, they are mounted on a cylindrical mandrill and processed in a manner process similar to that heretofore described, with the outer surface of the belt being coated.

Figure 3:
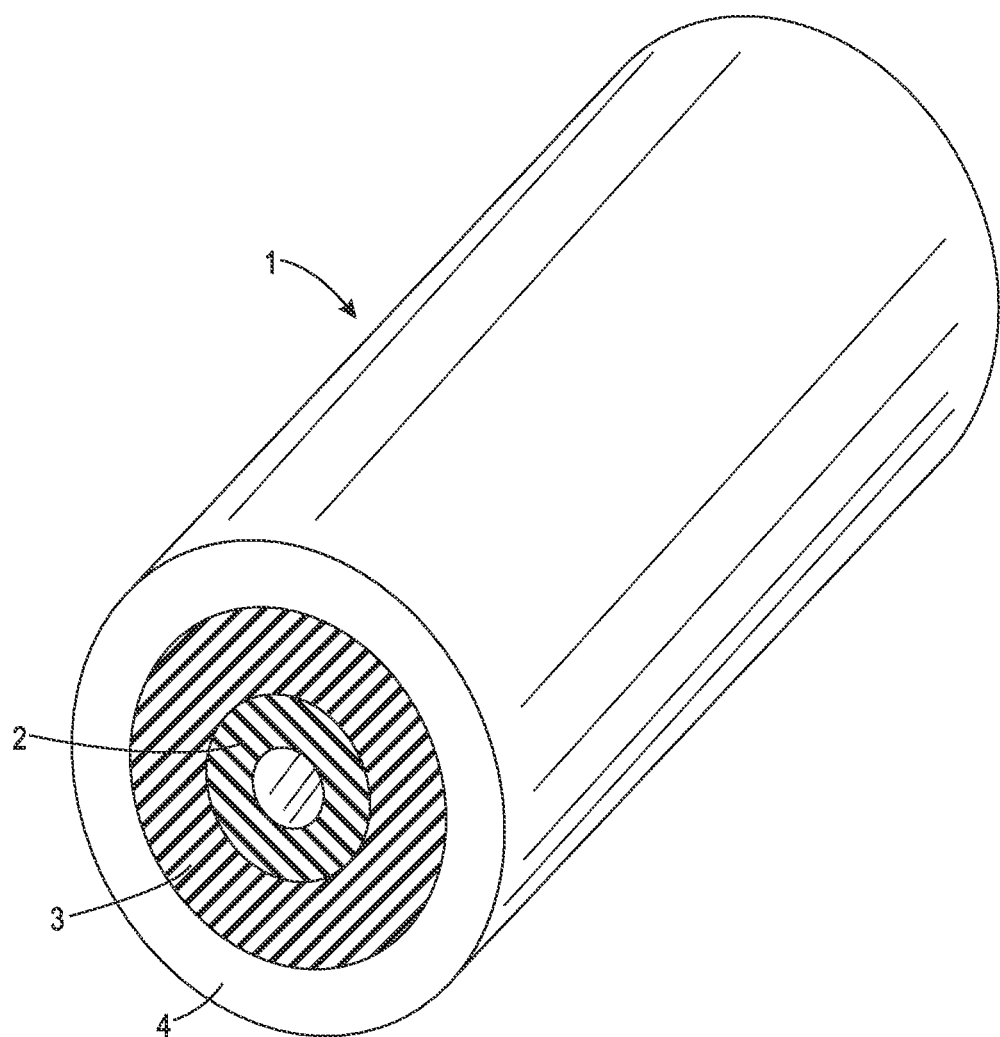
FIG. 3 is an enlarged view of a fuser roll demonstrating an embodiment disclosed herein.
Figure 4:
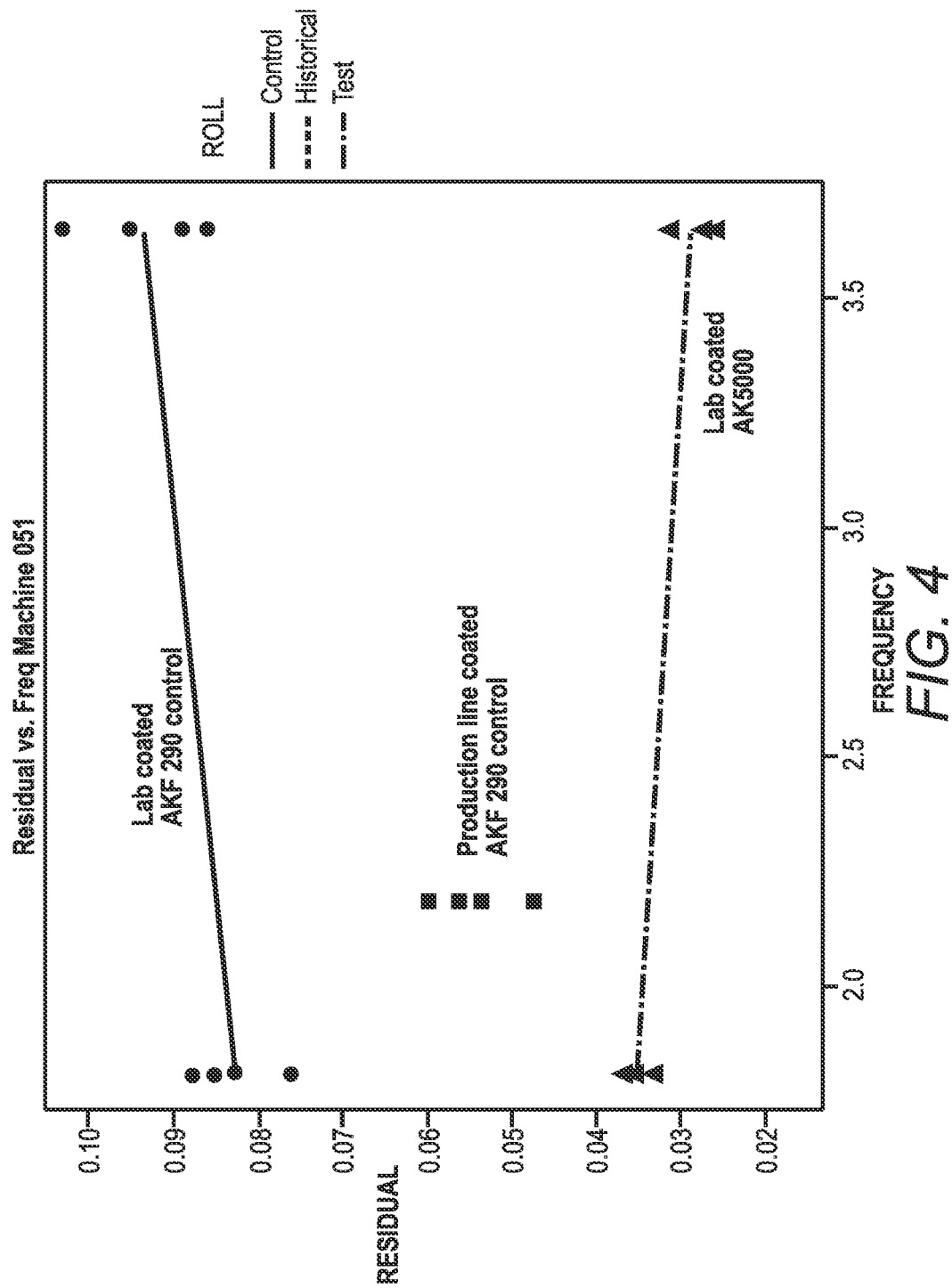
FIG. 4 is a graph of the amplitude for a defect comparing the fuser member disclosed herein versus a prior art fuser member.

Referring to FIG. 3, an embodiment disclosed herein is depicted, wherein the fuser roll 1 prepared by a flow coating process comprises a substrate 2 and thereover an adhesive layer 3 and a fusing layer 4. In an embodiment, the substrate is a hollow cylindrical metal core. The adhesive layer 3 may be an amino silane adhesive layer and the outer layer 4 is a fluoroelastomer layer.

Surface finish was measured using a surface texture measuring instrument, Federal Products Corp. Surfanalyzer Model 2000 with a 2 micron probe or equivalent correlated equipment. Calibrations was done using Calibration Standard, Federal Products Corp. Model PMD-90300 Reference Specimen, or equivalent. The reported surface finish values in table are average roughness Ra in microns.

Surface gloss of the topcoat was measured using Gardener Gloss Meter, 75°, or manufacturer's equivalent. Roll Diameter and runout were measured using Zygo 131E Laser Inspect System or equivalent. Roll durometer was measured using Constant load durometer device, Shore O, with a 1115 gram (2.54 lb.) weight. Visual inspection of the rolls was done Eye loupe, 7X, with 25.4 mm (1 in.) grid divided into 127 μm (0.005 in.) increments and with inscribed 254 μm (10 mil) diameter circle. Rule, 150 mm (6 in.) scale divided into 0.25 mm (0.010 in.) increments and 2×15 watt fluorescent light fixture.

Visual inspection consisted of the following observations and gave a Pass/Fail grade to each fuser roll.
1. Pinhole, Topcoat Chipout (Surface Depressions)—Measure length and width (or diameter) using eye loop and estimating to nearest 0.13 mm (0.005 in.) increment.
2. Scratch—Examine visually and manually for any lines in the surface which can be felt with fingertip or fingernail.
3. Smear/Crater/Grooves/Barber Poling—Examine visually and manually for any deviations from the finished product surface contour.
4. Embedded Contaminants and Rods—Note location and measure length and width (or diameter) using eye loop. Estimate to the nearest 0.13 mm (0.005 in.) increment. Also, examine manually for any deviation from the surface contour.
5. Surface Contaminants—View the surface without magnification from a distance of approximately 300 mm (12 in.). Note the presence of any surface contaminant.
6. Check inside of roll for chips, cardboard or other loose or flaking material.
7. Check the roll surface for silicone rubber protrusions or silicone rubber show-through or uncoated areas of silicone rubber.

Lab coated F2 rolls disclosed herein and lab coated F1 rolls (current mainline control) were tested in an iGen5 machine (150 ppm) in B207. Tests showed both F2 and mainline F1 control rolls to have similar fuse fix performance and similar lifetime to failure performance. However, barber pole defect performance of F1 rolls was significantly better than F2 control rolls.

In FIG. 3, a graph showing the residual (amplitude) for the Barber Pole defect from the F1 Test and control rolls. For each frequency the residual amplitude represents the level above the visible threshold. For example, residual=0 means no visually perceptible difference—banding cannot be seen. Lower residual implies lower degree of visually perceptible banding. The F2 Test roll shows a significantly lower value which indicates that there is a lower level for the Barber Pole defect.

The key advantages of the disclosure herein provide significant improvement in minimizing barber pole print defect.

It will be appreciated that variants of the above-disclosed and other features and functions or alternatives thereof may be combined into other different systems or applications. Various presently unforeseen or unanticipated alternatives, modifications, variations, or improvements therein may be subsequently made by those skilled in the art, which are also encompassed by the following claims.

What is claimed is:

1. A flow coating solution comprising:
a fluoroelastomer;
a nucleophilic crosslinking agent;
a non-functional polydimethylsiloxane consisting of the formula:

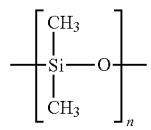

wherein n is from 100 to 20,000; and
an effective solvent selected from the group consisting of N-methyl 2-pyrrolidone, dimethyl formamide, and dimethyl sulfoxide.

2. A flow coating solution as claimed in claim 1, wherein n is from 100 to 10,000.

3. A flow coating solution as claimed in claim 1, the flow coating solution has a viscosity of from 100 to 10,000 centipoise (Cp).

4. A flow coating solution as claimed in claim 1, wherein said effective solvent is N-methyl 2-pyrrolidone.

5. A flow coating solution as claimed in claim 1, wherein said nucleophilic crosslinking agent comprises a material selected from the group consisting of a bisphenol, a quaternary phosphonium salt, hexamethylenediamine carbamate, N, N'-dicinnamylidene-1,6 hexanediamine, and mixtures thereof.

6. A flow coating solution as claimed in claim 3, wherein said nucleophilic crosslinking agent comprises a bisphenol and a quaternary phosphonium salt.

7. A flow coating solution as claimed in claim 1, wherein said fluoroelastomer is selected from the group consisting of a) copolymers of vinylidene fluoride, hexafluoropropylene and tetrafluoroethylene, b) terpolymers of vinylidene fluoride, hexafluoropropylene and tetrafluoroethylene, and c) tetrapolymers of vinylidene fluoride, hexafluoropropylene, tetrafluoroethylene and a cure site monomer.

8. A flow coating solution as claimed in claim 1, wherein said fluoroelastomer comprises 35 mole percent of vinylidenefluoride, 34 mole percent of hexafluoropropylene, 29 mole percent of tetrafluoroethylene and 2 mole percent of a cure site monomer.

9. A flow coating solution as claimed in claim 1, wherein said flow coating solution has a viscosity of from about 200 to about 3500 centipoise.

10. A flow coating solution as claimed in claim 1, wherein said fluoroelastomer is present in an amount of from about 15 to about 35 percent by weight of total solids.

11. A flow coating solution as claimed in claim 1, wherein said crosslinking agent is present in an amount of from about 2 to about 6 percent by weight of total solids.

12. A flow coating solution as claimed in claim 1, wherein said effective solvent is present in an amount of from about 65 to about 85 percent by weight of total solids.

13. A flow coating solution as claimed in claim 1, wherein said coating is applied to a substrate at a thickness of from about 0.001 to about 0.005 inches per pass.

14. A flow coating solution as claimed in claim 1, wherein from about 95 to about 100 percent of said coating solution applied to a substrate adheres to said substrate.

15. A fuser member comprising a substrate and a fluoroelastomer layer, wherein said fluoroelastomer layer is prepared by flow coating a flow coating solution to said substrate by rotating the substrate in a horizontal position about a longitudinal axis thereof and simultaneously applying the flow coating solution from an applicator to the substrate in a spiral pattern in a controlled amount so that substantially all the coating from the applicator adheres to said substrate, wherein said flow coating solution comprises a fluoroelastomer, a nucleophilic crosslinking agent, a non-functional polydimethylsiloxane consisting of the formula:

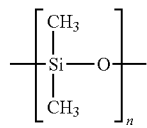

wherein n is from 100 to 10,000, and an effective solvent selected from the group consisting of N-methyl 2-pyrrolidone, dimethyl formamide, and dimethyl sulfoxide.

16. A fuser member as claimed in claim 15, wherein said nucleophilic crosslinking agent comprises a bisphenol and a quaternary phosphonium salt.

17. A fuser member as claimed in claim 15, wherein said fluoroelastomer is selected from the group consisting of a) copolymers of vinylidene fluoride, hexafluoropropylene, and tetrafluoroethylene, b) terpolymers of vinylidene fluoride, hexafluoropropylene and tetrafluoroethylene, and c) tetrapolymers of vinylidene fluoride, hexafluoropropylene, tetrafluoroethylene and a cure site monomer.

18. A fuser member as claimed in claim 15, wherein said fluoroelastomer layer further comprises a metal oxide dispersed therein.

19. A fuser member as claimed in claim 18, wherein said metal oxide is selected from the group consisting of cupric oxide, aluminum oxide and mixtures thereof.

20. An image forming apparatus comprising:
a charge-retentive surface to receive an electrostatic latent image thereon;
a development component to apply toner to said charge-retentive surface to develop said electrostatic latent image to form a developed image on said charge retentive surface;
a transfer component to transfer the developed image from said charge retentive surface to a copy substrate; and
a fuser member for fusing toner images to a surface of said copy substrate, wherein said fuser member comprises: a substrate and a fluoroelastomer layer, wherein said fluoroelastomer layer is prepared by flow coating a flow coating solution on said substrate by rotating the substrate in a horizontal position about a longitudinal axis thereof and simultaneously applying the flow coating solution from an applicator to the substrate in a spiral pattern in a controlled amount so that substantially all the coating from the applicator adheres to said substrate, wherein said flow coating solution comprising a fluoroelastomer, a nucleophilic crosslinking agent, a non-functional polydimethylsiloxane having consisting of the formula:

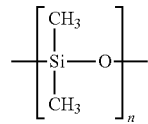

wherein n is from 100 to 20,000, and an effective solvent selected from the group consisting of N-methyl 2-pyrrolidone, dimethyl formamide, and dimethyl sulfoxide.

* * * * *